US010084940B2

(12) United States Patent
Lim

(10) Patent No.: US 10,084,940 B2
(45) Date of Patent: Sep. 25, 2018

(54) IMAGE FORMING APPARATUS, AND METHOD FOR IMAGE PROCESSING THEREOF

(71) Applicant: S-Printing Solution Co., Ltd., Suwon-si, Gyeonggi-do (KR)

(72) Inventor: Kang-hee Lim, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/360,272

(22) Filed: Nov. 23, 2016

(65) Prior Publication Data

US 2017/0180605 A1 Jun. 22, 2017

(30) Foreign Application Priority Data

Dec. 18, 2015 (KR) ........................ 10-2015-0182138

(51) Int. Cl.

| | |
|---|---|
| ***H04N 1/40*** | (2006.01) |
| ***G06K 15/00*** | (2006.01) |
| ***H04N 1/44*** | (2006.01) |
| ***G06K 9/00*** | (2006.01) |
| ***H04N 1/32*** | (2006.01) |

(52) U.S. Cl.

CPC ......... *H04N 1/448* (2013.01); *G06K 9/00456* (2013.01); *G06K 9/00469* (2013.01); *H04N 1/32149* (2013.01); *G06K 2209/01* (2013.01); *H04N 2201/0094* (2013.01); *H04N 2201/3226* (2013.01)

(58) Field of Classification Search

CPC ............... H04N 1/448; H04N 1/32149; H04N 2201/0094; H04N 2201/3226; G06K 9/00456; G06K 9/00469; G06K 2209/01

USPC ................. 358/3.28, 1.9, 1.15; 382/139, 137

See application file for complete search history.

(56) References Cited

U.S. PATENT DOCUMENTS 5,668,874 A 9/1997 Kristol et al.
2010/0251109 A1* 9/2010 Jin ..................... H04N 1/00153 715/273
2015/0379300 A1* 12/2015 Terada ............... G06K 9/00469 726/28

FOREIGN PATENT DOCUMENTS

| | | | |
|---|---|---|---|
| KR | 10-2006-0074912 | A | 7/2006 |
| KR | 10-0748676 | B1 | 8/2007 |
| KR | 10-0806340 | B1 | 2/2008 |
| KR | 10-1512948 | B1 | 4/2015 |
| WO | 2004-036802 | A1 | 4/2004 |

* cited by examiner

*Primary Examiner* — Quang N Vo
(74) *Attorney, Agent, or Firm* — Jefferson IP Law, LLP

(57) ABSTRACT

An image forming apparatus and a method for imaging process thereof are provided. The image forming apparatus includes a scanner configured to scan a transcript and generate a scanned image, at least one processor configured to determine a type of the transcript using the scanned image, detect a personal information area within the scanned image based on the determined type of the transcript, and correct the scanned image by blurring the detected personal information area, and an image forming device configured to print the corrected scanned image.

19 Claims, 15 Drawing Sheets

IMAGE FORMING APPARATUS, AND METHOD FOR IMAGE PROCESSING THEREOF

CROSS-REFERENCE TO RELATED APPLICATION(S)

This application claims the benefit under 35 U.S.C. § 119(a) of a Korean patent application filed on Dec. 18, 2015 in the Korean Intellectual Property Office and assigned Serial number 10-2015-0182138, the entire disclosure of which is hereby incorporated by reference.

TECHNICAL FIELD

The present disclosure relates to an image forming apparatus and an image processing method thereof. More particularly, the present disclosure relates to an image forming apparatus which may proceed with personal information included in a scanned transcript and an image processing method thereof.

BACKGROUND

Currently, financial institutions and mobile communication companies customarily require that a service user presents an identification card for identification confirmation when the user opens an account and/or joins a membership. For confirmation, a front side and a rear side of the identification card are copied and/or scanned, and are saved in an information communication network as a file.

At this time, when a resident registration card which is commonly used as an identification card is presented, a financial institution and a mobile communication provider stores fingerprint information on a rear side as well as a user name, resident registration number, photo, address, thus saving bio information which is not encoded. The resident registration card is an example, and other forms of identification can be used as well, such as a driver's license, a state residence card, a health insurance card, and the like.

It would not be an issue to process identification using a resident registration card, but by saving such information, there a problem is that personal information such as a resident registration number and fingerprint information (or other forms of personal identification) can be exposed to hacking, and due to exposure of personal information, secondary damage may occur. Accordingly, it is necessary to develop technologies, such that when copying a transcript including personal information, the personal information is deleted, masked, or encoded, so as to prevent such information from being exposed and protect personal information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image forming apparatus which can blur (e.g., blur out) or encode personal information included in a scanned transcript to protect, and an image processing method thereof.

In accordance with an aspect of the present disclosure, an image forming apparatus is provided. The image forming apparatus includes a scanner configured to scan a transcript and generate a scanned image, at least one processor configured to determine a type of the transcript using the scanned image, detect a personal information area within the scanned image based on the determined type of the transcript, and correct the scanned image by blurring or blurring out the detected personal information area, and an image forming device (or an image forming device) configured to print the corrected scanned image.

The at least one processor may recognize a letter with respect to the scanned image and determines whether the preset text is included in the scanned image to determine a type of the transcript.

The apparatus may further include a storage configured to store position and size information of a transcript name area and a personal information area, wherein the at least one processor may detect a transcript area within the scanned image and detect a personal information area within the detected transcript area using position information of personal information corresponding to the determined type of transcript.

The apparatus may further include a manipulation inputter configured to receive position and size information of a transcript name area and a personal information area, wherein the at least one processor may store position and size information of the received transcript name area and personal information area in the storage.

The apparatus may further include a storage configured to store the corrected scanned image.

The blurring or blurring out may convert the detected personal information area to a blank image or a mosaic.

The at least one processor may encode information within the detected personal information area, convert the detected personal information area to an encoded image corresponding to the encoded information to correct the scanned image.

The at least one processor may generate an encoded image using information within the detected personal information area and encoding time information together.

The apparatus may further include a communicator configured to be connected with an external server, wherein the at least one processor may control the communicator to transmit information within the personal information area to the external server, and when an encoding code corresponding to the transmitted information is received from the external server, convert the detected personal information area to an encoded image corresponding to the received encoding code and correct the scanned image.

In accordance with another aspect of the present disclosure, a method for image processing of an image forming apparatus is provided. The method includes scanning a transcript and generating a scanned image, determining a type of the transcript using the scanned image, detecting a personal information area within the scanned image based on the determined type of the transcript, correcting the scanned image by blurring or blurring out the detected personal information area, and printing the corrected scanned image.

The determining of the type of the transcript may include recognizing a letter with respect to the scanned image and determining whether the preset text is included in the scanned image to determine a type of the transcript.

The method may further include storing position and size information of a transcript name area and a personal information area, wherein the detecting of the personal information area may include detecting a transcript area within the scanned image, and detecting a personal information area within the detected transcript area using position information of personal information corresponding to the determined type of transcript.

The method may further include receiving information on a position and size of a transcript name area and a personal information area, wherein the storing of the position and size information may include storing position and size information of the received transcript name area and personal information area.

The method may further include storing the corrected scanned image.

The blurring or blurring out of the detected personal information area may include converting the detected personal information to a blank image or a mosaic.

The correcting of the scanned image may include encoding information within the detected personal information area, converting the detected personal information area to an encoded image corresponding to the encoded information to correct the scanned image.

The encoding may include encoding using information within the detected personal information area and encoding time information together.

The correcting of the scanned image may include transmitting information within the personal information area to the external server, and when an encoding code corresponding to the transmitted information is received from the external server, converting the detected personal information area to an encoded image corresponding to the received encoding code and correcting the scanned image.

In accordance with another aspect of the present disclosure, a non-transitory computer-readable recording medium having recorded thereon at least one program comprising commands, which when executed by a computer, performs an image processing method of an image forming apparatus is provided. The method includes scanning a transcript and generating a scanned image, determining a type of the transcript using the scanned image, detecting a personal information area within the scanned image based on the determined type of a transcript, blurring or blurring out the detected personal information area and correcting the scanned image, and printing the corrected scanned image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
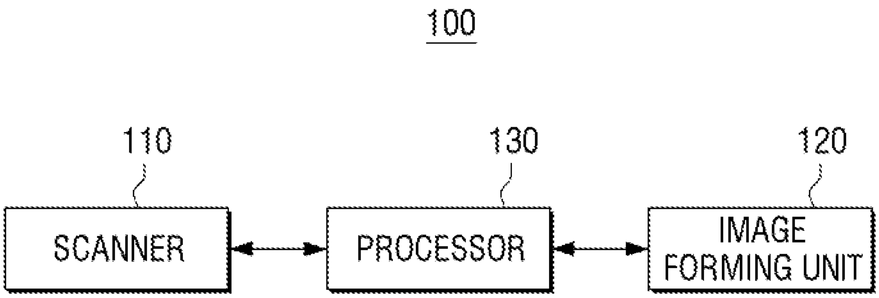
FIG. 1 is a block diagram illustrating a simple configuration of an image forming apparatus according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

In the present disclosure, relational terms such as first and second, and the like, may be used to distinguish one entity from another entity, without necessarily implying any actual relationship or order between such entities.

The terms, “include”, “comprise”, “is configured to”, etc. of the description are used to indicate that there are features, numbers, operations, elements, parts or combination thereof, and they should not exclude the possibilities of combination or addition of one or more features, numbers, operations, elements, parts or combination thereof.

In an embodiment, ‘a module’ or ‘a unit’ performs at least one function or operation, and may be realized as hardware, software, or combination thereof. In addition, a plurality of 'modules' or a plurality of 'units' may be integrated into at least one module and may be realized as at least one at least one processor (not shown) except for 'modules' or 'units' that should be realized in a specific hardware.

In an embodiment of the present disclosure, an image forming apparatus is an apparatus which performs generating, printing, receiving, and transmitting image data. As a representative example, there may be a printer, a scanner, a copy machine, a fax, and a multi-function device which integrates functions of these devices.

In an embodiment of the present disclosure, a 'transcript' may be an identification certificate including personal information. For example, a transcript may include a resident registration certification, a driver's license, and a passport. However, the transcript is not limited thereto and may include personal information such as a resume, and all the documents which can be copied can be a 'transcript.'

Hereinafter, various embodiments of the present disclosure will be described in detail with accompanying drawings.

FIG. 1 is a block diagram illustrating simple features of an image forming apparatus according to an embodiment of the present disclosure.

Referring to FIG. 1, an image forming apparatus 100 includes a scanner 110, an image forming unit (or image forming device) 120, and a processor 130 (e.g., at least one processor).

The scanner 110 generates a scanned image by scanning a transcript. To be specific, the scanner 110 may generate a scanned image by scanning one side or both sides of a transcript according to a user input.

The image forming unit 120 prints a scanned image corrected by the processor 130. To be specific, the image forming unit 120 may directly output the corrected scanned image on a printing paper of the image forming apparatus 100. In the meantime, the image forming unit 120 may output a scanned image on a user interface (UI) screen provided on an area of the image forming apparatus 100.

The processor 130 corrects a scanned image generated by the scanner 110. To be specific, the processor 130 may correct a scanned image by detecting one or more personal information areas within a scanned image. At this time, the processor 130 may determine a type of a scanned transcript using a generated scanned image, and detect a personal information area within a scanned image based on a determined type of the transcript. Specifically, the processor 130 may perform character recognition regarding a generated scanned image, determine whether a preset text is included in the scanned image to determine a type of a transcript. A method of determining a type of a transcript using a scanned image will be described in greater detail with reference to FIG. 4.

In the meantime, the processor 130 may blur or blur out the detected personal information area within a scanned image and correct a scanned image. To be specific, the processor 130 may correct a scanned image by converting a detected personal information area to a blank image, or making the image a mosaic (e.g., by blurring the image). Various embodiments of a corrected scanned image will be described in detail with reference to FIGS. 8A, 8B, 9A, 9B, 10A, and 10B.

Figure 2:
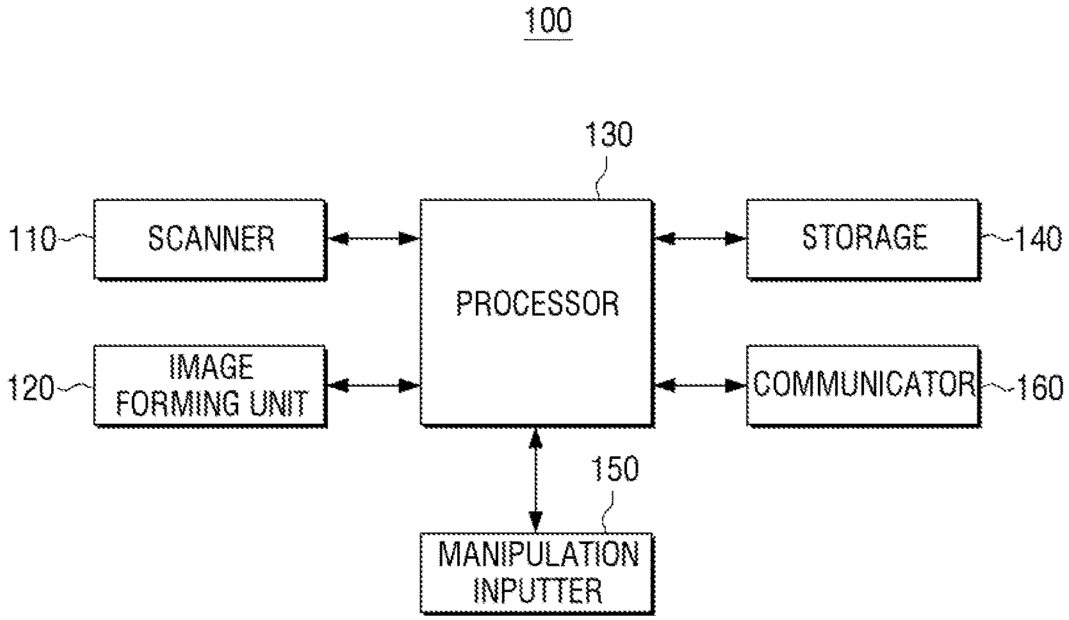
FIG. 2 is a block diagram illustrating detailed configuration of the image forming apparatus of claim 1 according to an embodiment of the present disclosure.

FIG. 2 is a block diagram illustrating a detailed feature of the image forming apparatus of FIG. 1 according to an embodiment of the present disclosure.

Referring to FIG. 2, the image forming apparatus 100 may include the scanner 110, the image forming unit 120, the processor 130, a storage 140, a manipulation inputter 150 and a communicator 160.

The scanner 110 and the image forming unit 120 included in the image forming apparatus 100 according to an embodiment of the present disclosure are the same as the features illustrated in FIG. 1 and thus will not be further described.

The processor 130 may control the manipulation inputter 150 to display a UI to receive information on a position and a size of a transcript name area and a personal information area from a user. At this time, when information on a position and a size of a transcript name area and a personal information area is input, the processor 130 may store inputted information to the storage 140. A method of inputting information on a position and a size of a transcript name area and personal information area using a displayed UI on the manipulation inputter 150 will be further described with reference to FIG. 7.

The processor 130 may determine a type of a scanned transcript using a scanned image. To be specific, the processor 130, by performing character recognition on a scanned image, may determine a type of a transcript by determining whether a preset text is included. In the meantime, the processor 130 may detect a part corresponding to a transcript name area of a scanned image by using information on a position and size of a transcript name area stored in the storage 140 and decide a type of a transcript by comparing stored information and detected area. When a transcript area within the scanned image is inclined, the processor 130 may determine a type of a transcript by altering or changing angles thereof. A method of determining a type of a transcript using a scanned image will be described in greater detail with reference to FIGS. 3A, 3B, 4A, and 4B.

The processor 130 may detect a personal information area using a scanned image. To be specific, the processor 130 may detect a personal information area based on a determined type of a transcript. At this time, the processor 130 may detect a personal information area within a scanned image by using information on a position and size of a personal information area stored in the storage 140. Further at this time, the stored information on a position and size of a personal information area may be included in a stored database or designated by a user through the manipulation inputter 150.

The processor 130 may correct a scanned image by blurring (or blurring out) the detected personal information area. At this time, blurring or blurring out can mean changing a detected personal information area to a blank image or making it a mosaic.

In the meantime, the processor 130 may encode a detected personal information area within the generated scanned image and amend the scanned image. To be specific, the processor 130 may correct a scanned image by encoding information obtained by recognizing characters on the detected personal information area. At this time, the processor 130 may generate an encoded image by using encoded time information along with information within the detected personal information area.

In the meantime, the processor 130 may use a verified encoding algorithm such as AES256 and RSA2048. The encoding algorithm may indicate an algorithm which outputs and generates encoded data by inputting an original text and an encoded key, and in this case, when a trusted platform module (TPM) which is a security module to provide safe storage space to store an encoded key, a password, and a digital certificate is provided in the image forming apparatus 100, the processor 130 may generate and store a key using the TPM.

At this time, the processor 130, such that information within the personal information area detected by an external server can be encoded, may control the communicator 160 to transmit information, to an external server, in the personal information area, and receive an encoded code.

The storage 140 may store information on a position and size of a personal information area according to a transcript name area, name of a transcript and a type of a transcript. To be specific, information on a position and size of a transcript name area and a personal information area may be included in the stored database, and information on a position and size of an area set by a user using the manipulation inputter 150.

In the meantime, the storage 140 may store a scanned image corrected by the processor 130. To be specific, the storage 140 may store a corrected scanned image by blurring or blurring out or encoding a personal information area within a scanned image. At this time, the storage 140 may store one or more scanned images that have not been corrected, amended, or corrected, as well.

The manipulation inputter 150 may receive information on a position and size of a transcript name area and a personal information area from a user. To be specific, the manipulation inputter 150 may be a touch screen located on an area of the image forming apparatus 100 to receive a user input. In this case, the manipulation inputter 150 may display a UI to receive information on a position and size of a transcript name area and a personal information area, and receive user input. In the meantime, a UI to receive information on a transcript name area and a personal information area will be further described with reference to FIG. 7. The manipulation inputter 150 may display a corrected scanned image according to an embodiment.

The communicator 160 is formed to connect the image forming apparatus 100 with an external device, and can be connected to an external device through local area network (LAN) and internet network, and also can be connected by mobile communication (for example, global system for mobile communications (GSM), universal mobile telecommunications system (UMTS), long term evolution (LTE), wireless broadband (WiBro), etc.). To be specific, the communicator 160 may be formed to connect a server which is an external server with the image forming apparatus 100.

The communicator 160 may transmit information within the detected personal information area inside the scanned image to a server. To be specific, the communicator 160 may transmit, to a server, recognized information by using character recognition of detected personal information area within the scanned image. At this time, the communicator 160 may encode and transmit information within the detected personal information area of the scanned image.

The communicator 160 may receive an encoded code generated from a server. To be specific, the communicator 160 may receive an encoded code corresponding to information within the personal information area generated within a server.

Figure 3A:
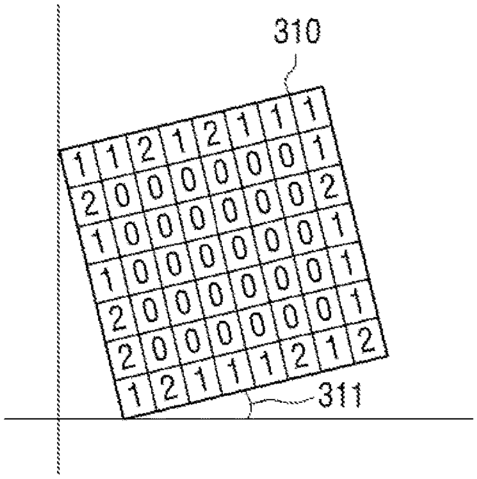
FIGS. 3A and 3B are views that illustrate a method for correcting an angle of a scanned image according to an embodiment of the present disclosure.
Figure 3B:
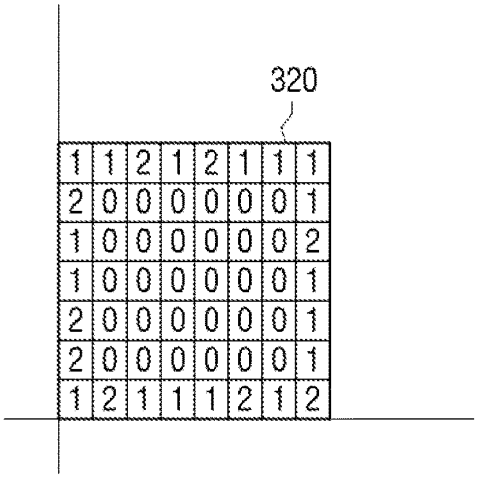

FIGS. 3A and 3B are views that illustrate a method for correcting an angle of a scanned image according to an embodiment of the present disclosure. To be specific, FIG. 3A is a view illustrating an inclined transcript area 310 within a scanned image, and FIG. 3B illustrates a scanned image after correcting an angle of the inclined transcript area.

Referring to FIG. 3A, a transcript area 310 within a scanned image can be inclined at a predetermined angle 311. At this time, an image forming apparatus may discern edge of a transcript area using difference of brightness/darkness within a scanned image and determine the predetermined angle 311 of the transcript area 310 within the scanned image. For example, an image forming apparatus may determine a pixel of which brightness/darkness within a scanned image is greater than a preset value as edge of the transcript area 310.

An image forming apparatus may compare horizontal and vertical criteria of a scanned image with edge of the determined transcript area 310 to determine the inclined predetermined angle 311 of the transcript area 310 and correct it, to obtain a scanned image including the angle-corrected transcript area 320 as illustrated in FIG. 3B.

In the meantime, although the embodiment described above can discern a transcript area within a scanned image using difference of brightness/darkness and correct an angle, other embodiments may discern whether or not to recognized character that is inclined is determined through character recognition, and correct an angle of a transcript area.

Figure 4A:
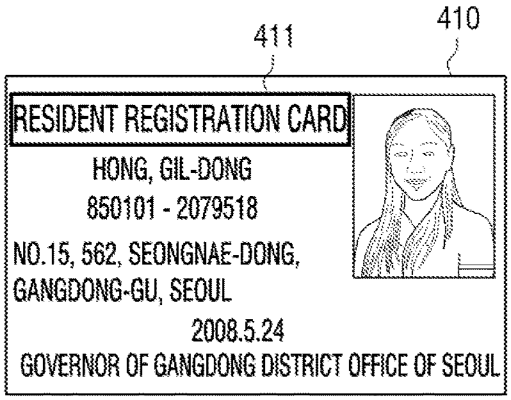
FIGS. 4A and 4B are views that illustrate a method for determining a type of a transcript according to an embodiment of the present disclosure.
Figure 4B:
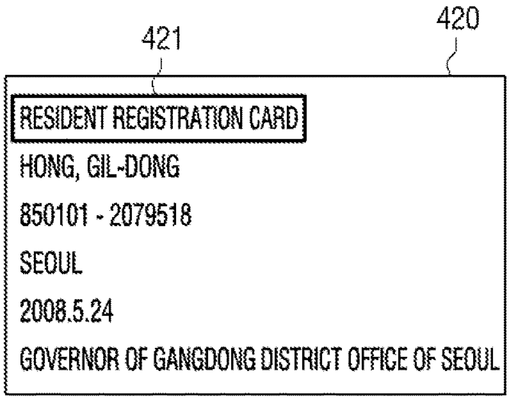

FIGS. 4A and 4B are views that illustrate a method for determining a type of a transcript according to an embodiment of the present disclosure. To be specific, FIGS. 4A and 4B includes FIG. 4A illustrating a scanned image of a transcript and FIG. 4B illustrating a result of character recognition on a scanned image of FIG. 4A.

Referring to FIG. 4A, a scanned image 410 of a transcript includes a transcript name 411 for identifying a type of a transcript. For example, when scanning a resident registration card, a text 'resident registration card' from among a scanned image can be a transcript name which can identify a type of a scanned transcript.

The image forming apparatus may perform character recognition on a scanned image as in FIG. 4A and generate an image as illustrated in FIG. 4B. Referring to FIG. 4B, when an area 421 including a text 'resident registration card' corresponding to a transcript name is detected within a scanned image 420 performing character recognition, an image forming apparatus can determine that a type of a transcript to be a resident registration card.

In the meantime, it has been illustrated and described that a type of a transcript is determined by performing character recognition, but when embodying the disclosure, without performing character recognition, a type of a transcript can be determined by comparing an area within the detected scanned image with an image of the prestored transcript name area using information on a position and size of a transcript name area and determining whether the image is identical with the image of the transcript name area.

Figure 5A:
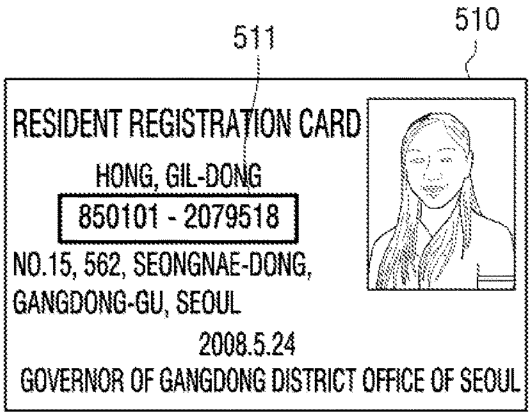
FIGS. 5A, 5B, 6A, and 6B are that illustrate describe a method for detecting a personal information area according to various embodiments of the present disclosure.
Figure 5B:
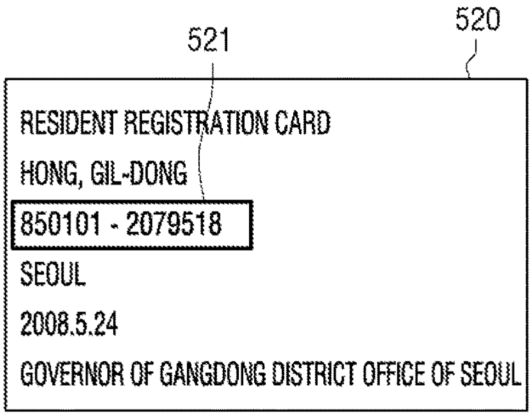

FIGS. 5A and 5B are views that illustrate a method for detecting a personal information area according to an embodiment of the present disclosure. To be specific, when scanning both sides of a transcript, FIGS. 5A and 5B illustrates FIG. 5A which illustrates a scanned image of a front side of a transcript and FIG. 5B which illustrates a result of detecting personal information area by performing character recognition of a scanned image.

Referring to FIG. 5A, a scanned image 510 of a transcript includes a personal information area 511. For example, when scanning a resident registration card, an area where a resident registration number is recited from among scanned image can be the personal information area 511.

The image forming apparatus may perform character recognition on scanned image of FIG. 5A and generate an image as illustrated in FIG. 5B. Referring to FIG. 5B, it can be detected that an area 521 including a resident registration number within the scanned image 520 performing character recognition as a personal information area.

To be specific, the image forming apparatus may detect a personal information area based on prestored information. For example, the image forming apparatus may detect a personal information area using information (e.g., six-digit seven-digit) regarding the stored resident registration number. At this time, the image forming apparatus may detect a personal information area using a condition to detect a resident registration number such as the third digit from among 6-digit number is 0 or 1, the fifth digit from among 6-digit number is one of 0 to 3, and the first digit from among 7-digit number is one of 1 to 4, but this is a general method of detecting a resident registration number and will not be further described.

In the meantime, it has been illustrated and described that a personal information area is detected within a scanned image after performing character recognition, when embodying the disclosure, a personal information area can be detected within a scanned image using information on a position and size of a personal information area, without performing character recognition. This will be described in greater detail with reference to FIGS. 6A and 6B.

Figure 6A:
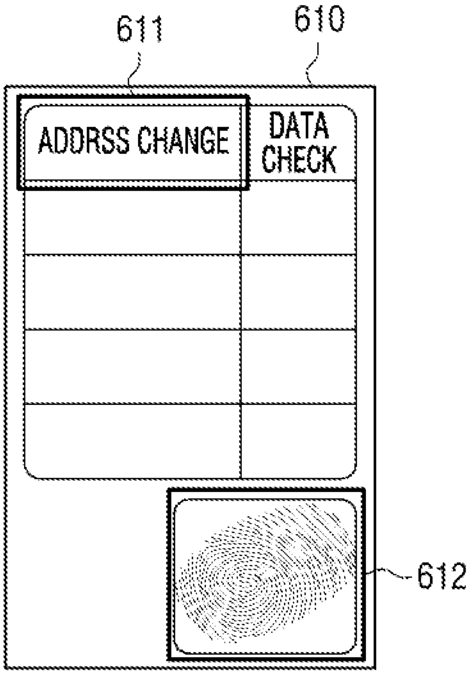
Figure 6B:
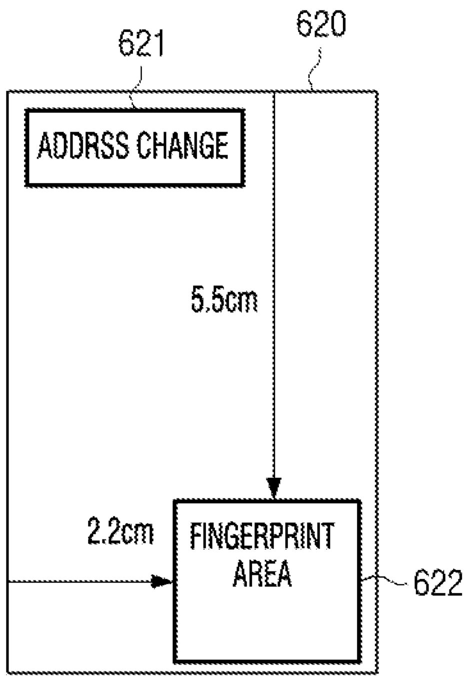

FIGS. 6A and 6B are views that illustrate a method for detecting a personal information area according to an embodiment of the present disclosure. To be specific, when scanning both sides of a transcript, FIG. 6A illustrates a scanned image of a rear side of a transcript and FIG. 6B illustrates a result of a personal information area which cannot be detected by character recognition in a scanned image of FIG. 6A.

Referring to FIG. 6A, a scanned image 610 of a transcript includes an area 611 to determine a type of a transcript and a personal information area 612. For example, when scanning a rear side of a resident registration card, a transcript of which an area of 'address change' is scanned can be determined as a rear side of a resident registration card, and an area where a fingerprint is displayed may be a personal information area 612.

The image forming apparatus may generate an image as illustrated in FIG. 6B by performing character recognition on a scanned image of FIG. 6A. Referring to FIG. 6B, when a text of 'address change' is detected within a scanned image 620 performing character recognition, the image forming apparatus can determine that a type of a scanned transcript is a rear side of a resident registration card.

At this time, an image forming apparatus may detect a personal information area within a scanned image based on prestored information. For example, the image forming apparatus may detect a transcript area 621 within a scanned image using difference of brightness and darkness, and detect a preset area disposed at a preset distance from an edge of a transcript area as a personal information area. To be specific, the image forming apparatus may detect that, from an upper edge of the transcript area, an area of a preset size positioned at a distance of 5.5 cm from an upper edge and 2.2 cm from a left edge is a fingerprint area 622. In the meantime, a method of detecting a personal information area with reference to an edge of the transcript area is an example and therefore not limiting. When embodying the various embodiments of the present disclosure, a method of detecting a preset area at a preset distance with reference to a transcript name area as a personal information area can be used.

Figure 7:
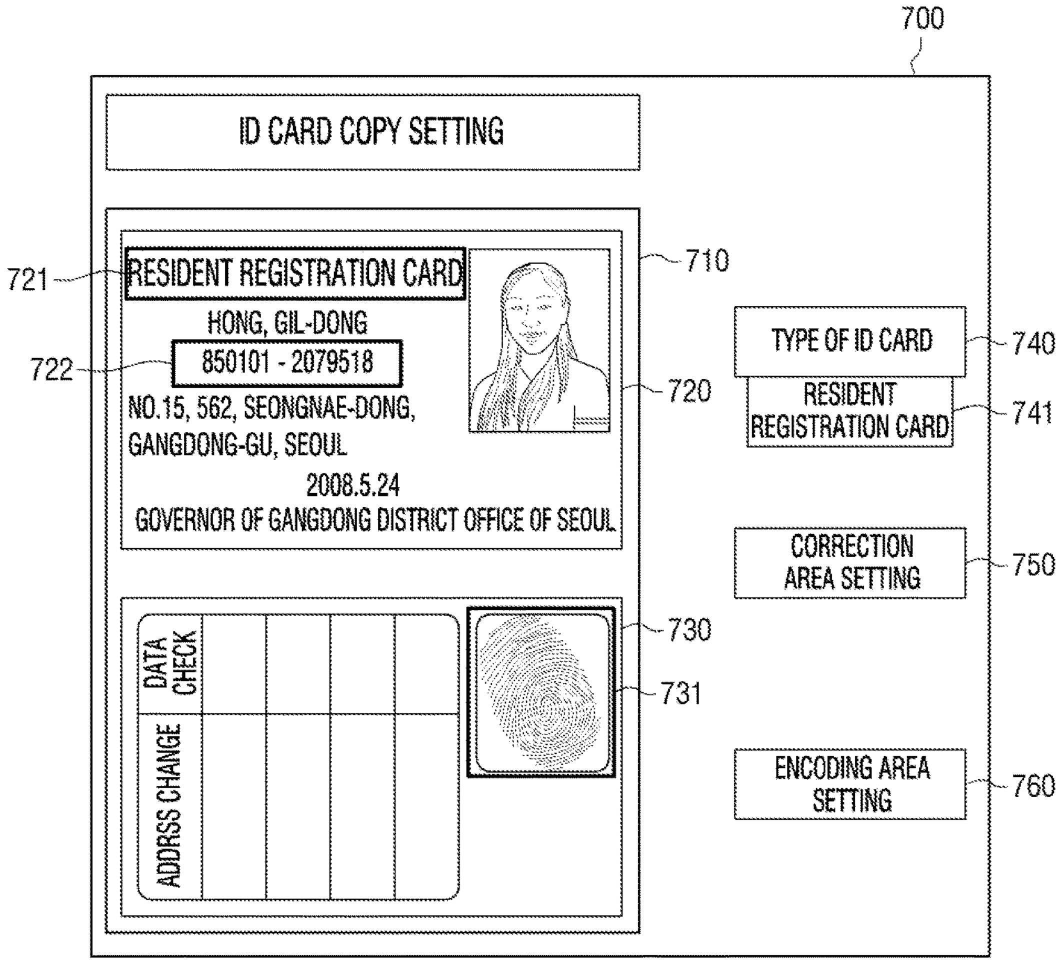
FIG. 7 is a view illustrating an embodiment of a copy setting user interface (UI) to receive a type of a transcript and a personal information area according to an embodiment of the present disclosure.

FIG. 7 is a view illustrating an embodiment of a copy setting UI to receive a type of a transcript and a personal information area according to an embodiment of the present disclosure.

Referring to FIG. 7, a copy setting UI 700 to receive a type of a transcript and a personal information area from a user can be an identification card copy setting UI. To be specific, the copy setting UI 700 configured to receive a type of a transcript and a personal information area may include a tap 740 to show a scanned image 710 including transcript areas 720, 730, a tap 750 to set a correction area, and a tap 760 to set an encoding area.

At this time, a user may select the tap 740 to set a type of an identification card and select a name 741 of a scanned identification card. For example, the name 741 of an identification card may be a resident registration card, which can be stored in database or may be input by a user. To be specific, the name 741 of an identification card selected from the tap 740 to set a type of an identification card by a user can be a name of an actual identification card such as 'resident registration card', and a 'driver's license card', or a name such as '1' and '2' designated by a user.

At this time, the image forming apparatus may receive information on a position and size with respect to an area to determine a type of an identification card which is set according to a name of an identification card. For example, with regard to an image forming apparatus, when a name 741 of an identification card selected from the tap 740 to set a type of an identification is a resident registration card, information may be inputted that an area where 'resident registration card' which is a name area 721 of an identification card within a scanned image is written in an area for determining a type of an identification card set by a user.

In addition, the image forming apparatus may receive information on a correction area which is set by a user. To be specific, the image forming apparatus may receive information on a position and size of personal information areas 722, 731 for correcting included in the transcript areas 720, 730 within the scanned image 710 set by a user, after selecting a tap 750 for setting a correction area.

In addition, the image forming apparatus may receive information on an encoding area which is set by a user. To be specific, the image forming apparatus, after a user selects a tap 760 for setting an encoding area, may receive information on a position and size of the personal information areas 722, 731 for correcting included in the transcript areas 720, 730 within the scanned image 710 which is set by a user.

In addition, the image forming apparatus may store a name of a transcript inputted by a user and information on a position and size of a personal information area to the storage.

In the meantime, it has been described that a copy setting UI to receive a type of a transcript and a personal information area from a user is displayed in a manipulation inputter provided on an image forming apparatus, but when embodying the disclosure, it can be embodied that the UI is displayed on a display provided on an external host device connected to the image forming apparatus and receives a user input.

Figure 8A:
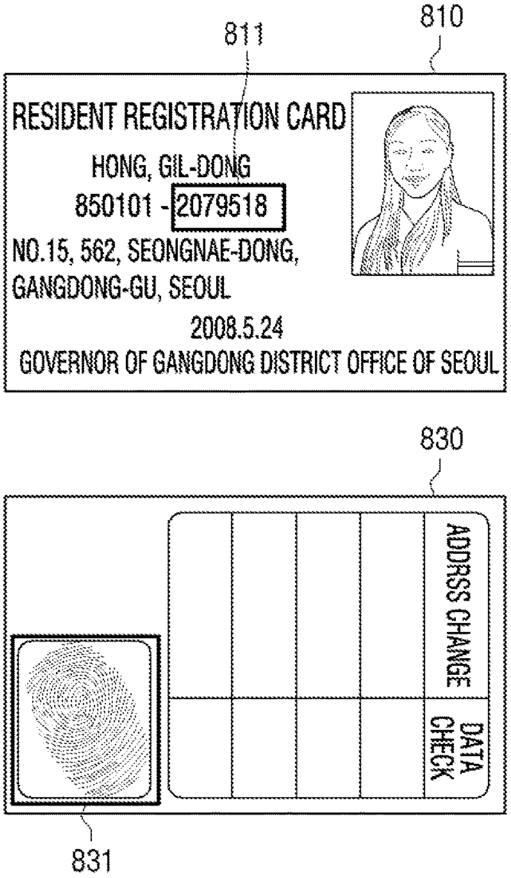
FIGS. 8A, 8B, 9A, 9B, 10A, and 10B are views illustrating an image where personal information is processed according to various embodiments of the present disclosure.
Figure 8B:
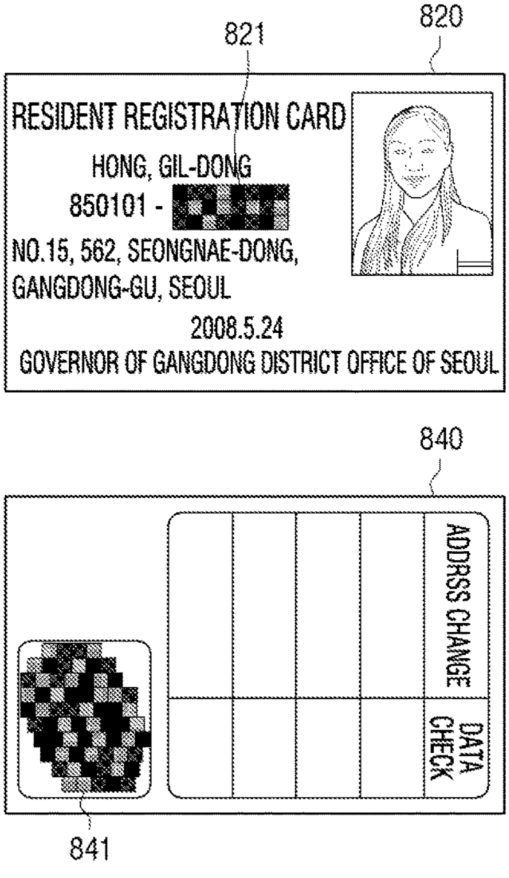
Figure 9A:
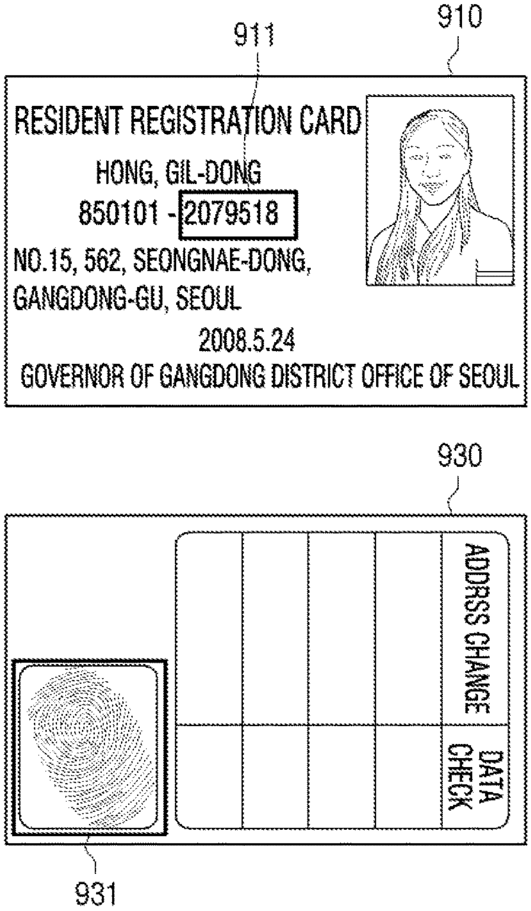
Figure 9B:
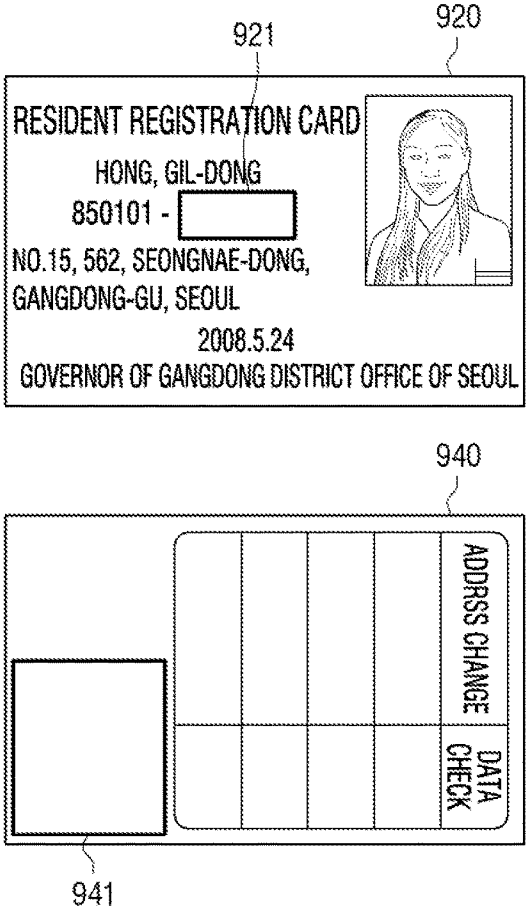
Figure 10A:
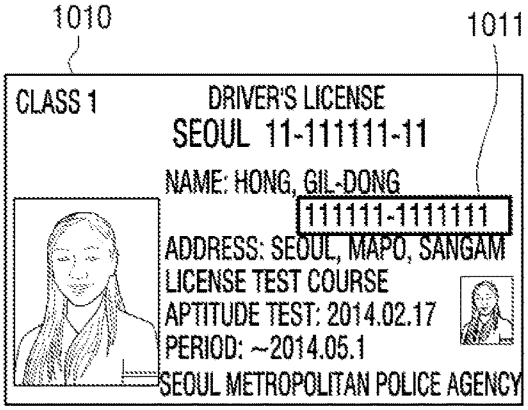
Figure 10B:
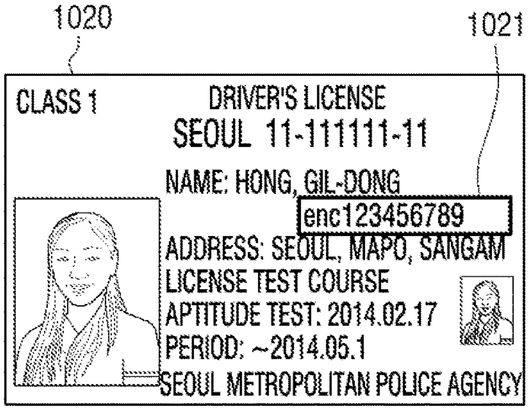

FIGS. 8A, 8B, 9A, 9B, 10A, and 10B are views illustrating an image of processing personal information according to various embodiments of the present disclosure. To be specific, FIGS. 8A and 8B illustrate an embodiment of making a personal information area detected within a scanned image as a mosaic, FIGS. 9A and 9B illustrate an embodiment of deleting a personal information area detected within a scanned image, and FIGS. 10A and 10B illustrate an embodiment of encoding a personal information area detected within a scanned image.

Referring to FIG. 8A, a scanned image 810, 830 before amendment includes personal information areas as they are. To be specific, the scanned image 810 before amendment of a front side of a transcript may include a resident registration number 811, and the scanned image 830 before amendment of a rear side of a transcript may include fingerprint information 831.

According to an embodiment of the present disclosure, the image forming apparatus, as illustrated in FIG. 8B, corrects a scanned image, makes a personal information area within a scanned image as mosaic, and generates a corrected scanned image 820. To be specific, after correcting a front side of a transcript, the corrected scanned image 820 may include a resident registration number area 821 which is made to be mosaic, and after correcting a rear side of a transcript, a scanned image 840 may include a fingertip area 841 which is made to be mosaic.

In the meantime, referring to FIG. 9A, a scanned image 910, 930 of a transcript before correction includes personal information areas 911, 931 as they are. To be specific, the scanned image 910 before correction of a front side of a transcript may include the resident registration number 911 and the scanned image 930 before correction of a rear side of a transcript may include transcript information 931.

According to an embodiment of the present disclosure, the image forming apparatus may correct a scanned image, delete a personal information area within a scanned image as illustrated in FIG. 9B and generate a corrected scanned image 920. To be specific, after correcting a front side of a transcript, the corrected scanned image 920 may include a blank image and a converted resident registration number area 921, and after correcting a rear side of a transcript, a scanned image 940 may include a blank image and a converted fingerprint information area 941.

In the meantime, it has been described that, from among resident registration number corresponding to the personal information area within a scanned image, last seven digits are to be corrected, but when embodying, it can be implemented that the total resident registration number is corrected.

Referring to FIG. 10A, a scanned image 1010 of a transcript before correction includes a personal information area as it is. To be specific, the scanned image 1010 before correction may include the resident registration number 1011.

According to an embodiment of the present disclosure, the image forming apparatus may correct the scanned image as illustrated in FIG. 10B, encode a personal information area within a scanned image, and generate a corrected scanned image 1020. To be specific, after correcting a front side of a transcript, the corrected scanned image 1020 may include an encoded image and a converted resident registration number area 1021. In the meantime, the encoded image may be generated in the image forming apparatus or generated by an external server. If the encoded image is composed of an encoding ID, a user's identification can be confirmed by encoding identification (ID) only, and intensified security can be provided.

According to an embodiment of the present disclosure, the image forming apparatus may print or store a scanned image corrected. Therefore, even if a transcript including personal information of a user is copied, exposure of personal information of a user can be prevented.

Figure 11:
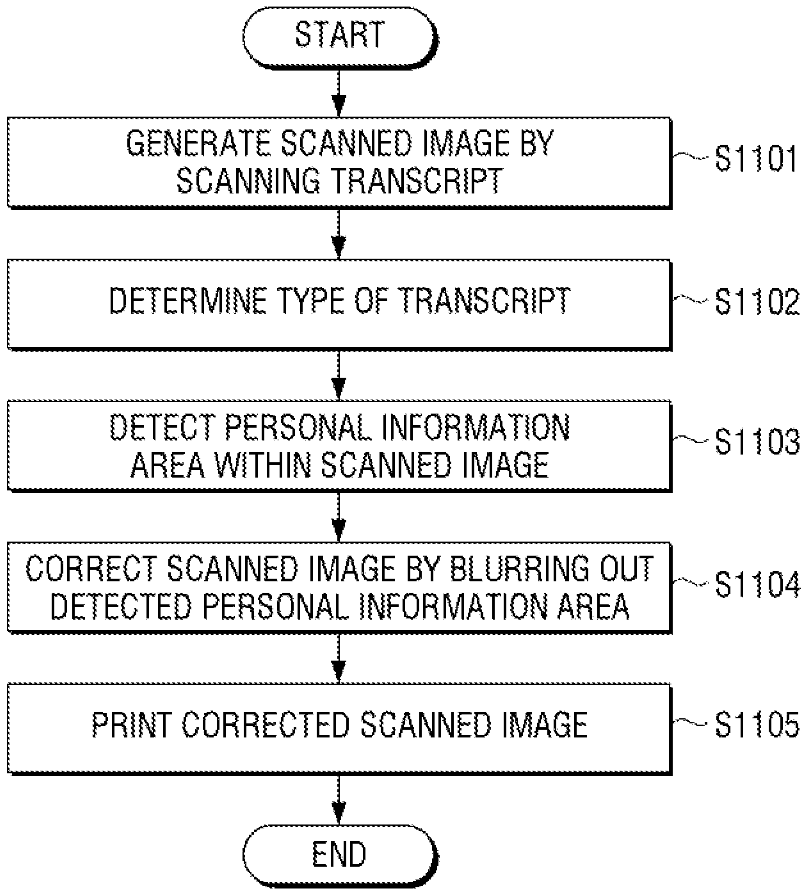
FIGS. 11 and 13 are flowcharts that illustrate an image processing method according to various embodiments of the present disclosure.

FIG. 11 is a flowchart that illustrates a method for image processing which blurs or blurs out the personal information area according to an embodiment of the present disclosure.

Referring to FIG. 11, the image forming apparatus scans a transcript and generates a scanned image at operation S1101. At this time, the image forming apparatus may scan one side or both sides of a transcript according to designated setting and a user's selection and generate a scanned image.

Then, the image forming apparatus may determine a type of a scanned transcript at operation S1102. To be specific, the image forming apparatus may determine a type of a scanned transcript using a generated scanned image. A method for determining a type of a scanned transcript is the same as a method of FIGS. 4A, 4B, 6A, and 6B and will not be further described.

Then, the image forming apparatus may detect a personal information area within a scanned image at operation S1103. To be specific, the image forming apparatus may detect a personal information area within a scanned image based on a type of a determined transcript. A method of detecting a personal information area within a scanned image is as illustrated in FIGS. 4A to 6B and will not be further described.

The image forming apparatus may correct the scanned image by blurring or blurring out the detected personal information area at operation S1104. To be specific, the image forming apparatus may delete the detected personal information area, that is, convert and correct the area with a blank image. In the meantime, the image forming apparatus may correct the detected personal information area by making it mosaic.

The image forming apparatus may print a corrected scanned image at operation S1105. To be specific, the image forming apparatus may blur or blur out the detected personal information area and print a corrected scanned image. The image forming apparatus may store along with a corrected scanned image to a storage, or store without printing on a paper. Therefore, even if copying a transcript including personal information of a user, personal information of a user is not exposed, and security-enhanced image forming apparatus and an image processing method can be provided.

Figure 12:
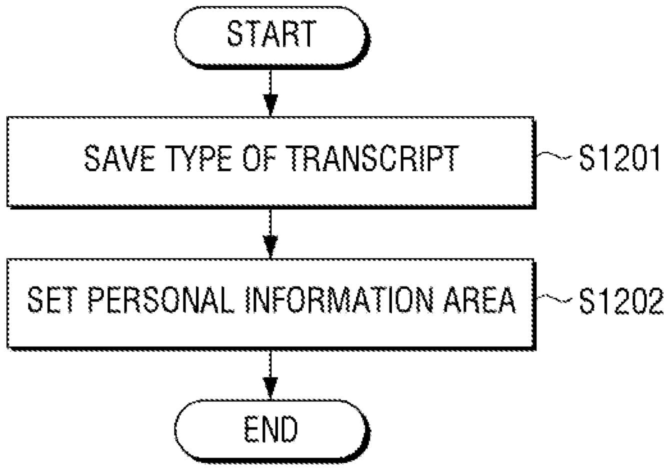
FIG. 12 is a flowchart that illustrates an embodiment of a method of setting a personal information area according to an embodiment of the present disclosure.

FIG. 12 is a flowchart that illustrates a method of setting a personal information area from a user according to an embodiment of the present disclosure. To be specific, the image forming apparatus may display a copy setting UI and receive a type of a transcript and a personal information area from a user.

Referring to FIG. 12, the image forming apparatus may store a type of a transcript by user setting at operation S1201. To be specific, the image forming apparatus may display a copy setting UI and receive a type of a transcript to conduct copying and store the same. At this time, the image forming apparatus may store a transcript name area illustrating a type of a transcript set by a user so that a type of a scanned transcript can be determined.

The image forming apparatus may set a personal information area by a user input at operation S1202. To be specific, the image forming apparatus may receive a personal information area which is set to be different according to a type of a transcript from a user and store the same. Therefore, when copying a new transcript not included in database of the image forming apparatus, a personal information area cannot be exposed, and a security enhanced image forming apparatus and an image processing method can be provided.

Figure 13:
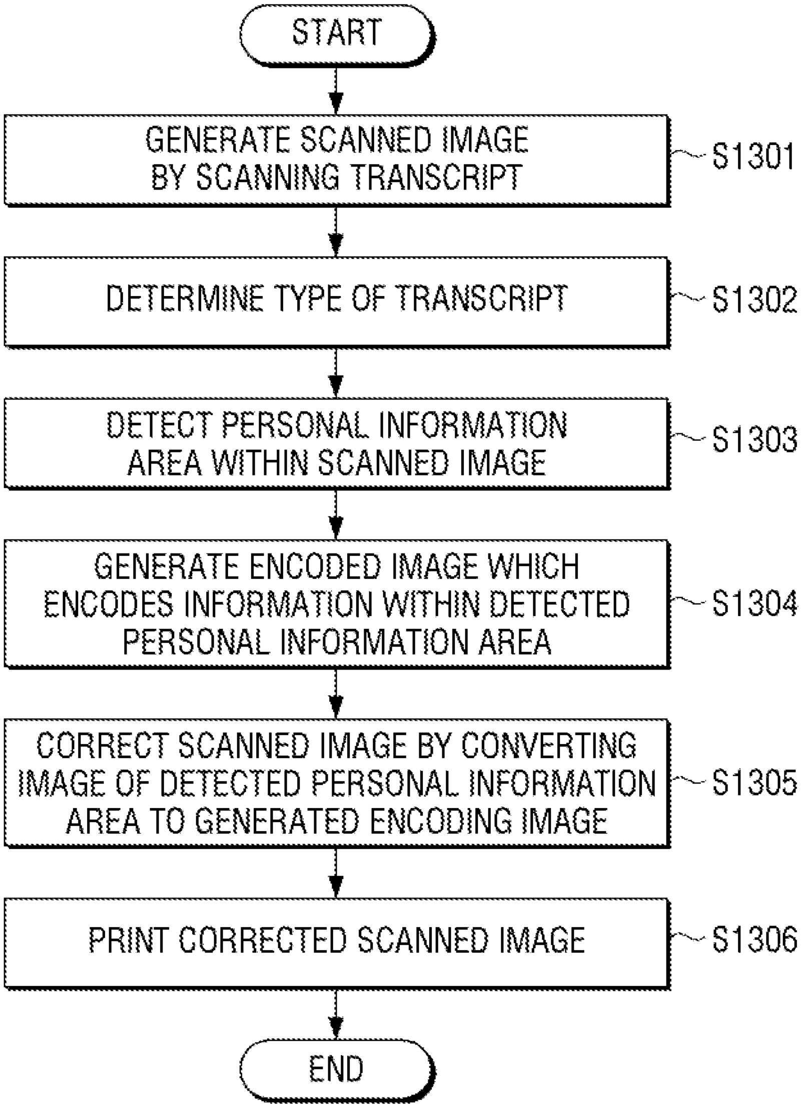

FIG. 13 is a flowchart that illustrates an image processing method according to various embodiments of the present disclosure.

Referring to FIG. 13, the image forming apparatus scans a transcript and generates a scanned image at operation S1301. At this time, the image forming apparatus may scan one side or both sides of a transcript according to designated setting or user selection and generate a scanned image.

The image forming apparatus may determine a type of a scanned transcript at operation S1302. To be specific, the image forming apparatus may determine a type of a scanned transcript using a generated scanned image. A method for determining a type of a scanned transcript is as illustrated in FIGS. 4A, 4B, 6A, and 6B and will not be further described.

Then, the image forming apparatus may detect a personal information area within a scanned image at operation S1303. To be specific, the image forming apparatus may detect a personal information area based on a determined type of a transcript. A method of detecting a personal information area within a scanned image is as illustrated in FIGS. 4A to 6B, and will not be further described.

The image forming apparatus may generate an encoding image which encodes information within a detected personal information area at operation S1304. To be specific, an encoding image which encodes information within the detected personal information area can be generated using encoding algorithm such as AES256 and RSA2048 which are verified to be safe. At this time, information within the personal information area can be recognized by performing character recognition.

When the TPM is provided on the image forming apparatus, the image forming apparatus may generate and store encoding key using the TPM. In the meantime, if the TPM is not provided on the image forming apparatus, the image forming apparatus may generate an encoding key randomly or store an encoding key inputted by a user within an encoded area in a storage, and perform encoding by obfuscation of relevant codes.

In the meantime, the image forming apparatus may perform encoding by using information of the detected personal information area and encoding time. Therefore, when a scanned image which is encoded and corrected is reused by others, an image forming apparatus which can filter the above and an image processing method can be provided.

In the embodiment above, it may be limited that information within the detected personal information area is encoded in the image forming apparatus, but when embodying various other embodiments of the present disclosure, encoding can be performed by an external device. A method of an image processing using an external device will be further described with reference to FIG. 15.

The image forming apparatus may encode the detected personal information area and correct the same. To be specific, the image forming apparatus may correct the scanned image by converting an image of the detected personal information area to a generated encoding image at operation S1305.

The image forming apparatus may print a corrected scanned image at operation S1306. To be specific, the image forming apparatus may encode the detected personal information area and print a corrected scanned image. In the meantime, the image forming apparatus may store the corrected scanned image in the storage along with printing, or store without printing. Due to the above, when copying a transcript including personal information, personal information of a user cannot be exposed and security-enhanced image forming apparatus and an image processing method can be provided.

Figure 14:
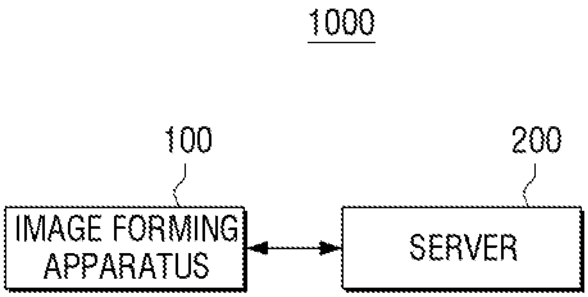
FIG. 14 is a view illustrating the configurations of an image processing system using an external server according to an embodiment of the present disclosure.

FIG. 14 is a view illustrating the feature of the image processing system using an external server according to an embodiment of the present disclosure.

Referring to FIG. 14, an image processing system 1000 according to an embodiment of the present disclosure includes the image forming apparatus 100 and a server 200.

The image forming apparatus 100 may transmit information within the detected personal information area to the server 200. At this time, the image forming apparatus 100 may encode information within the detected personal information area and transmit the information to the server 200.

In the meantime, the image forming apparatus 100 has the feature which is the same as FIGS. 1 and 2, and the image forming apparatus 100 will not be further described.

The server 200 receives information within the personal information area from the image forming apparatus 100 and performs encoding. To be specific, the server 200 receives information within the personal information area from the image forming apparatus 100 and generates an encoding code corresponding to the received information. At this time, the server 200 may generate an encoding code corresponding to information within a personal information area by receiving encoded information within a personal information area and decoding the information.

In addition, the server 200 may transmit the generated encoding code to the image forming apparatus 100. To be specific, the server 200 may encode a generated encoding code and transmit to the image forming apparatus 100.

In the above, it is described that an external device performing encoding is a server, but when embodying, encoding can be performed by using a host device performing encoding as an external device.

Figure 15:
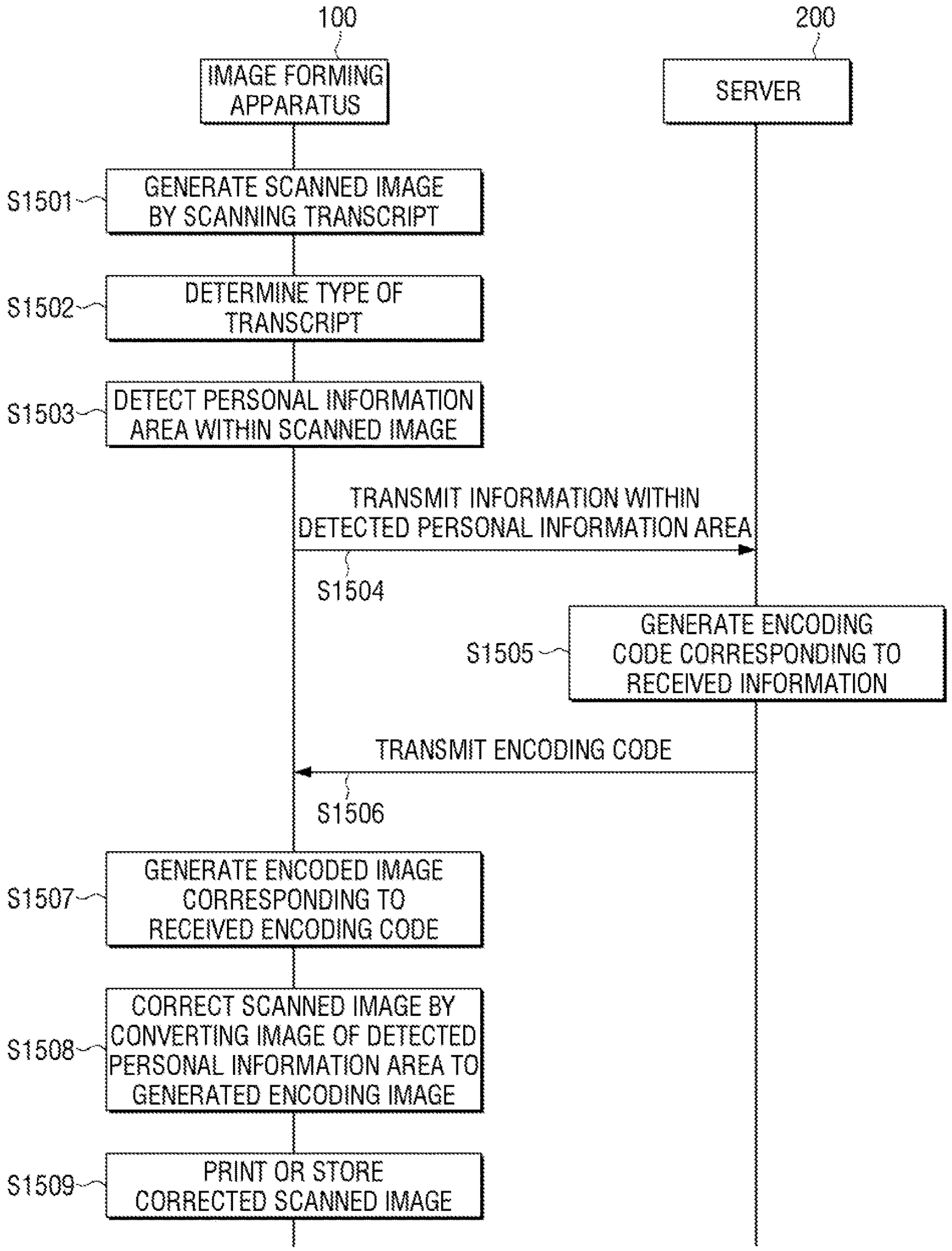
FIG. 15 is a flowchart illustrating an image processing method using an external server according to an embodiment of the present disclosure.

FIG. 15 is a flowchart showing an image processing method using an external server according to an embodiment of the present disclosure.

Referring to FIG. 15, it is illustrated that the image forming apparatus 100 scans a transcript and generates a scanned image at operation S1501. At this time, the image forming apparatus 100 scans one side or both sides of a transcript according to determined setting or a user selection and may generate a scanned image.

The image forming apparatus 100 may determine a type of a scanned transcript at operation S1502. To be specific, the image forming apparatus 100 may determine a type of a scanned transcript using a generated scanned image. A method of determining a type of a scanned transcript is as illustrated in FIGS. 4A, 4B, 6A, and 6B and will not be further described.

The image forming apparatus 100 may detect a personal information area within a scanned image at operation S1503. To be specific, the image forming apparatus 100 may detect a personal information area within a scanned image based on a determined type of a transcript. A method for detecting a personal information area within a scanned image is the same as illustrated in FIGS. 4A, 4B, 5A, 5B, 6A and 6B, and will not be further described.

The image forming apparatus 100 may transfer the detected information in the personal information area to the server 200. To be specific, the image forming apparatus 100 may transfer information within the personal information area recognized through character recognition to the server 200. At this time, the image forming apparatus 100 may encode information in the personal information area and transmit to the server 200. In the meantime, the image forming apparatus 100 may transmit an image of the detected personal information area to a server.

Then, the server 200 may receive information within the personal information area transmitted from the image forming apparatus 100 at operation S1504, and generate a corresponding encoding code at operation S1505. To be specific, after receiving and decoding information within the personal information area encoded and transmitted from the image forming apparatus 100, an encoding code corresponding to decoded information can be generated.

Then, the server 200 may transmit the generated encoding code to the image forming apparatus 100 at operation S1506. To be specific, the server 200 may encode the generated encoding code and transmit it to the image forming apparatus 100.

The image forming apparatus 100 may generate an encoded image corresponding to receive encoding code at operation S1507. To be specific, the image forming apparatus 100 may generate an encoded image corresponding to encoding code, by receiving and decoding encoding code transmitted from the server 200. In the meantime, encoding and decoding method used is a general method, as described above, and will not be further described.

The image forming apparatus 100 may decode and correct the detected personal information area. Specifically, the image forming apparatus may correct the scanned image by converting an image of the detected personal information area to a generated encoding image at operation S1508.

The image forming apparatus 100 may print and store a corrected scanned image at operation S1509. To be specific, the image forming apparatus 100 may encode a detected personal information area and print a corrected scanned image. The image forming apparatus may store along with a corrected scanned image to a storage, or store without printing on a paper. Therefore, even if copying a transcript including personal information of a user, personal information of a user is not exposed, and security-enhanced image forming apparatus and an image processing method can be provided.

As described above, according to various embodiments, when copying a transcript including personal information of a user, personal information of a user is not exposed and thus, a security-enhanced image forming apparatus and an image processing method can be provided.

The methods according to the various embodiments of this disclosure which are implemented in program instruction form that can be executed by various computer means may be recorded on computer readable media. The media may also include, alone or in combination with the program instructions, data files, data structures, and the like. For example, the computer readable medium is erasable or regardless of rewritable or not, contains a volatile or non-volatile storage device such as a storage device like a read-only memory (ROM), or for example, random-access memory (RAM), memory chips, device or integrated circuit (e.g., a computer) memory, or for example, a compact disc (CD), digital versatile disc (DVD), at the same time as a magnetic disk or an optical or magnetic recording is possible, such as a magnetic tape machine may be stored in a storage medium which can be read in. Memory that may be included in the mobile terminal is to be understood that an example of a storage medium readable by a machine suitable to store a program or programs comprising instructions to implement the various embodiments of the present disclosure. The media and program instructions may be the type that are well known and available to those skilled in the art, particularly with regard to computers configured or specially designed and constructed for the purposes of the various embodiments of the present disclosure.

According to an exemplary embodiment of the present disclosure, a non-transitory computer-readable recording medium having recorded thereon at least one program comprising commands, which when to executed by a computer, performs an image processing method of an image forming apparatus is provided. The non-transitory computer-readable recordable medium refers to a medium which may store data semi-permanently rather than storing data for a short time such as a register, a cache, and a memory and may be readable by an apparatus. Specifically, the non-transitory computer-readable recording medium may be a CD, a DVD, a hard disk, a Blu-ray disk, a universal serial bus (USB), a memory card, a ROM, etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image forming apparatus comprising:

a scanner to scan a transcript and generate a scanned image, the scanned image including a personal information area and a plurality of non-personal information areas;

at least one processor to:

determine a type of the transcript, from a plurality of types of transcripts, using the scanned image, detect the personal information area within the scanned image based on the determined type of the transcript, and correct the scanned image by blurring the detected personal information area without blurring the plurality of non-personal information areas; and an image forming device to print the corrected scanned image, the corrected scanned image including the blurred personal information area and the plurality of non-personal information areas that have not been blurred.

2. The image forming apparatus as claimed in claim 1, wherein the at least one processor:

recognizes a letter with respect to the scanned image, and determines whether a preset text is included in the scanned image to determine the type of the transcript.

3. The image forming apparatus as claimed in claim 1, further comprising:

a storage to store position and size information of a transcript name area and a personal information area, wherein the at least one processor:

detects a transcript area within the scanned image, and detects the personal information area within the detected transcript area using position information of personal information corresponding to the determined type of transcript.

4. The apparatus as claimed in claim 3, further comprising:

a manipulation inputter to receive the position and size information of the transcript name area and the personal information area, wherein the at least one processor stores position and size information of the received transcript name area and personal information area in the storage.

5. The apparatus as claimed in claim 1, further comprising:

a storage to store the corrected scanned image.

6. The apparatus as claimed in claim 1, wherein the blurring converts the detected personal information area to a blank image or a mosaic.

7. The apparatus as claimed in claim 1, wherein the at least one processor:

encodes information within the detected personal information area, and converts the detected personal information area to an encoded image corresponding to the encoded information to correct the scanned image.

8. The apparatus as claimed in claim 7, wherein the at least one processor generates an encoded image using information within the detected personal information area and encoding time information.

9. The apparatus as claimed in claim 6, further comprising:

a communicator connected with an external server, wherein the at least one processor:

controls the communicator to transmit information within the personal information area to the external server, and when an encoding code corresponding to the transmitted information is received from the external server, converts the detected personal information area to an encoded image corresponding to the received encoding code and corrects the scanned image.

10. A method for image processing of an image forming apparatus, the method comprising:

scanning a transcript and generating a scanned image, the scanned image including a personal information area and a plurality of non-personal information areas;

determining a type of the transcript, from a plurality of types of transcripts, using the scanned image;

detecting the personal information area within the scanned image based on the determined type of the transcript;

correcting the scanned image by blurring the detected personal information area without blurring the plurality of non-personal information areas; and printing the corrected scanned image, the corrected scanned image including the blurred personal information area and the plurality of non-personal information areas that have not been blurred.

11. The method as claimed in claim 10, wherein the determining of the type of the transcript comprises:

recognizing a letter with respect to the scanned image; and determining whether a preset text is included in the scanned image to determine the type of the transcript.

12. The method as claimed in claim 10, further comprising:

storing position and size information of a transcript name area and a personal information area, wherein the detecting of the personal information area comprises:

detecting a transcript area within the scanned image; and detecting the personal information area within the detected transcript area using position information of personal information corresponding to the determined type of transcript.

13. The method as claimed in claim 12, further comprising:

receiving information on the position and size of the transcript name area and the personal information area, wherein the storing of the position and size information comprises storing the position and size information of the received transcript name area and personal information area.

14. The method as claimed in claim 10, further comprising:

storing the corrected scanned image.

15. The method as claimed in claim 10, wherein the blurring of the detected personal information area comprises converting the detected personal information to a blank image or a mosaic.

16. The method as claimed in claim 10, wherein the correcting of the scanned image comprises:

encoding information within the detected personal information area; and converting the detected personal information area to an encoded image corresponding to the encoded information to correct the scanned image.

17. The method as claimed in claim 16, wherein the encoding comprises encoding using information within the detected personal information area and encoding time information.

18. The method as claimed in claim 16, wherein the correcting of the scanned image comprises:

transmitting information within the personal information area to the external server; and when an encoding code corresponding to the transmitted information is received from the external server, converting the detected personal information area to an encoded image corresponding to the received encoding code and correcting the scanned image.

19. A non-transitory computer-readable recording medium having recorded thereon instructions executable by a processor, the computer-readable recording medium comprising:

instructions to scan a transcript and generate a scanned image, the scanned image including a personal information area and a plurality of non-personal information areas;

instructions to determine a type of the transcript, from a plurality of types of transcripts, using the scanned image;

instructions to detect the personal information area within the scanned image based on the determined type of a transcript;

instructions to correct the scanned image by blurring the detected personal information area without blurring the plurality of non-personal information areas; and instructions to print the corrected scanned image, the corrected scanned image including the blurred personal information area and the plurality of non-personal information areas that have not been blurred.

* * * * *